United States Patent
Passint et al.

(10) Patent No.: US 11,573,898 B2
(45) Date of Patent: Feb. 7, 2023

(54) SYSTEM AND METHOD FOR FACILITATING HYBRID HARDWARE-MANAGED AND SOFTWARE-MANAGED CACHE COHERENCY FOR DISTRIBUTED COMPUTING

(71) Applicant: Hewlett Packard Enterprise Development LP, Houston, TX (US)

(72) Inventors: Randy Passint, Chippewa Falls, WI (US); Paul Frank, Chippewa Falls, WI (US); Russell L. Nicol, Chippewa Falls, WI (US); Thomas McGee, Chippewa Falls, WI (US); Michael Woodacre, Winchester (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/995,411

(22) Filed: Aug. 17, 2020

(65) Prior Publication Data
US 2022/0050780 A1 Feb. 17, 2022

(51) Int. Cl.
*G06F 12/0831* (2016.01)
*G06F 13/40* (2006.01)

(52) U.S. Cl.
CPC ...... *G06F 12/0831* (2013.01); *G06F 13/4027* (2013.01); *G06F 2212/271* (2013.01); *G06F 2212/62* (2013.01)

(58) Field of Classification Search
CPC ............. G06F 12/0831; G06F 13/4027; G06F 2212/271; G06F 2212/62; G06F 12/0817;
(Continued)

(56) References Cited

U.S. PATENT DOCUMENTS

| | | | |
|---|---|---|---|
| 5,710,907 A | * | 1/1998 | Hagersten ........... G06F 12/0813 711/148 |
| 5,860,146 A | | 1/1999 | Vishin et al. |

(Continued)

FOREIGN PATENT DOCUMENTS

| | | |
|---|---|---|
| CN | 105718242 | 6/2016 |
| CN | 105718242 A | 6/2016 |

OTHER PUBLICATIONS

Song, Wonjun, and John Kim. "A Case for Software-Based Adaptive Routing in NUMA Systems." 2019 IEEE 37th International Conference on Computer Design (ICCD). IEEE, 2019. (Year: 2019).*

(Continued)

*Primary Examiner* — Charles Rones
*Assistant Examiner* — Hewy H Li
(74) *Attorney, Agent, or Firm* — Park, Vaughan, Fleming & Dowler LLP (57) ABSTRACT

A node controller is provided to include a first interface to interface with one or more processors, a second interface including a plurality of ports to interface with node controllers within a base node and other nodes in the cache-coherent interconnect network. The node controller can further include a third interface to interface with a first plurality of memory devices and a cache coherence management logic. The cache coherence management logic can maintain, based on a first circuitry, hardware-managed cache coherency in the cache-coherent interconnect network. The cache coherence management logic can further facilitate, based on a second circuitry, software-managed cache coherency in the cache-coherent interconnect network.

14 Claims, 7 Drawing Sheets

(58) Field of Classification Search
CPC ............. G06F 12/0813; G06F 13/1663; G06F 13/1668; G06F 3/067; G06F 12/0837; G06F 12/0815; G06F 2212/2542; G06F 2212/272; G06F 2212/621
See application file for complete search history.

(56) References Cited

U.S. PATENT DOCUMENTS

| | | | |
|---|---|---|---|
| 6,275,900 B1 | 8/2001 | Liberty | |
| 6,631,448 B2 | 10/2003 | Weber | |
| 6,898,687 B2 | 5/2005 | Wu et al. | |
| 6,944,719 B2 | 9/2005 | Rowlands et al. | |
| 7,774,551 B2 | 8/2010 | Gaither et al. | |
| 7,895,400 B2 | 2/2011 | O'Krafka et al. | |
| 8,719,547 B2 | 5/2014 | Chinya et al. | |
| 9,684,597 B1 | 6/2017 | Eiriksson | |
| 10,268,630 B1 | 4/2019 | Dropps | |
| 10,366,006 B2 | 7/2019 | Xu et al. | |
| 10,402,330 B2 | 9/2019 | Kumar et al. | |
| 10,423,530 B2 | 9/2019 | Tourrilhes et al. | |
| 10,489,310 B2 | 11/2019 | Keeton et al. | |
| 10,592,465 B2 | 3/2020 | Dropps et al. | |
| 10,929,174 B2 | 2/2021 | Daglis et al. | |
| 11,157,405 B2 | 10/2021 | Rustad et al. | |
| 2002/0002659 A1* | 1/2002 | Michael | G06F 12/0875 711/141 |
| 2011/0004732 A1* | 1/2011 | Krakirian | G06F 12/0817 711/147 |
| 2015/0186057 A1* | 7/2015 | Das Sharma | G06F 9/52 711/153 |
| 2016/0328326 A1 | 11/2016 | Di et al. | |
| 2017/0228316 A1 | 8/2017 | Steinmacher-Burow | |
| 2018/0020054 A1 | 1/2018 | Woodacre et al. | |
| 2018/0322058 A1* | 11/2018 | Tourrilhes | G06F 12/0815 |
| 2019/0171574 A1 | 6/2019 | Wen | |
| 2020/0089612 A1 | 3/2020 | Rustad et al. | |
| 2020/0379664 A1* | 12/2020 | Mittal | G06F 3/0604 |
| 2021/0092069 A1 | 3/2021 | Musleh et al. | |
| 2021/0200545 A1* | 7/2021 | Marolia | G06F 9/30145 |
| 2021/0303481 A1 | 9/2021 | Ray et al. | |
| 2022/0035742 A1 | 2/2022 | Schumacher et al. | |

OTHER PUBLICATIONS

Shauradou. "Gen-Z Primer for Early Adopters", <https://www.plda.com/blog/category/technical-article/gen-z-primer-early-adopters>. Nov. 2018. (Year: 2018).*

Chaiken, D. et al.; "Software-Extended Coherent Shared Memory: Performance and Cost"; Jan. 5, 1998; 11 pages.

Keim, J. et al.; "A Hybrid Memory Model for Accelerators"; Jun. 19-23, 2010; 12 pages.

Muthukumar, S et al.; "Hybrid Cache Coherence Protocol for Multi-Core Processor Architecture"; May 2013; 6 pages.

Hong et al., "Hardware Implementation and Analysis of Gen-Z Protocol for Memory-Centric Architecture", IEEE Access, Digital Object Identifier, Jul. 22, 2020, 10 pages.

Intel Corporation, "Logical PHY Interface (LPIF) Specification", available online at <https://www.intel.com/content/dam/www/public/us/en/documents/technical-specifications/logical-phy-interface-specification.pdf>, Mar. 23, 2019, 63 pages.

Mark Funk, "Weaving Together the Machine's Fabric Memory", The Next Platform available online at <https://www.nextplatform.com/2016/01/18/weaving-together-the-machines-fabric-memory/>, Jan. 18, 2016, 9 pages.

Michael, M. et al.; "Coherence Controller Architectures for SMP-based CC-NUMA Multiprocessors"; Jun. 1, 1997; 10 pages.

Silicon Graphics, Inc., "System Overview," SGI Altix 3000 User's Guide, Ch. 3, Jan. 2003, 22 pages.

Timothy Prickett Morgan, CXL and Gen-Z Iron out a Coherent Interconnect Strategy', The Next Platform, available online at <https://www.nextplatform.com/2020/04/03/cxl-and-gen-z-iron-out-a-coherent-interconnect-strategy/>, Apr. 3, 2020, 9 pages.

Timothy Prickett Morgan, "Inside Hpe'S Gen-Z Switch Fabric", The Next Platform, available online at <https://www.nextplatform.com/2019/09/09/inside-hpes-gen-z-switch-fabric/>, Sep. 9, 2019, 15 pages.

Wikipedia, "Cache coherence," Jul. 29, 2020, <https://en.wikipedia.org/w/index.php? title=Cache_coherence&oldid=970166753>.

* cited by examiner

SYSTEM AND METHOD FOR FACILITATING HYBRID HARDWARE-MANAGED AND SOFTWARE-MANAGED CACHE COHERENCY FOR DISTRIBUTED COMPUTING

BACKGROUND

Field

This disclosure is generally related to the field of cache-coherence in a distributed computing system. More specifically, this disclosure is related to a system and method for facilitating hybrid hardware-managed and software-managed cache coherency for distributed computing.

Related Art

The proliferation of internet and e-commerce continues to create a vast amount of digital content. Various distributed storage systems have been created to access and store such digital content. However, the exponential growth of digital content can overwhelm traditional storage system architectures. Increasing memory capacity can be an option to accommodate such digital content. However, in a multi-processor system where a group of memory devices can be attached to the processors, current technologies often involve scaling both the number of memory devices attached to the processors and the number of processors in a multi-processor system. Increasing both the number of processors and the processor-attached memory devices can result in additional costs when applications may only desire an increase in memory capacity.

Additionally, multi-processor systems can include a plurality of processors interconnected via communication links for providing a cost-effective and high-speed computing environment. Each processor can be attached to a plurality of caches to provide increased computing power and speed. One of the challenges in a multi-processor system is the cache coherence problem. In a multi-processor system, multiple copies of the same data may exist in different caches at a given time. When one of the processors updates a local copy of the data, the other copies of the same data may not be updated, resulting in an inconsistent view of the memory.

Typically, the cache coherence problem can be solved by using hardware-managed cache coherence protocols. In some cases, software-managed coherence protocols have replaced hardware-managed coherence protocols. However, both types of coherence protocols come with their own set of advantages and disadvantages, thereby making cache-coherence in multi-processor systems a challenging task.

BRIEF DESCRIPTION OF THE FIGURES

In the figures, like reference numerals refer to the same figure elements.

DETAILED DESCRIPTION

Embodiments described herein solve the technical problem of scaling only memory capacity in a multi-processor system instead of scaling both the memory capacity and the processors, and to provide support for both software and hardware-managed cache-coherency. In other words, the presented system can independently scale cache coherent memory within the multi-processor system. Furthermore, a hybrid cache-coherent fabric can be built to facilitate optimized separation between software and hardware-managed cache coherency, thereby maximizing the performance efficiency of the system.

Furthermore, in existing multi-processor systems, the system memory is either entirely handled using hardware-managed coherency or none of the system memory may be handled using hardware-managed coherency. In addition, managing system memory based on hardware-managed coherency can result in additional utilization of memory bandwidth and can increase the latency of remote memory access. Furthermore, when a component in the system memory fails, the operation of the hardware-managed cache coherency protocol may be impacted.

To solve the aforementioned problems, embodiments described herein provide a system and method for managing a hybrid cache coherent multi-processor non-uniform memory access (NUMA) system that can maximize the performance efficiency by facilitating the optimized separation between software-managed and hardware-managed cache coherency. Furthermore, the NUMA system can facilitate the scaling of memory independent of the number of processors.

The term "fabric" refers to a network of communication links used for interconnecting a plurality of nodes, with each node optimally coupled to every other node via the communication links. Each node can include one or more processors, node controllers, memory bank(s), and other components.

In this disclosure, the terms "processor," "central processing unit," and "CPU" have been used interchangeably.

The term "CPU socket" refers to a connector that can house one or more processors and can provide one or more electrical interfaces to couple the one or more processors to a printed circuit board.

System Architecture

Figure 1:
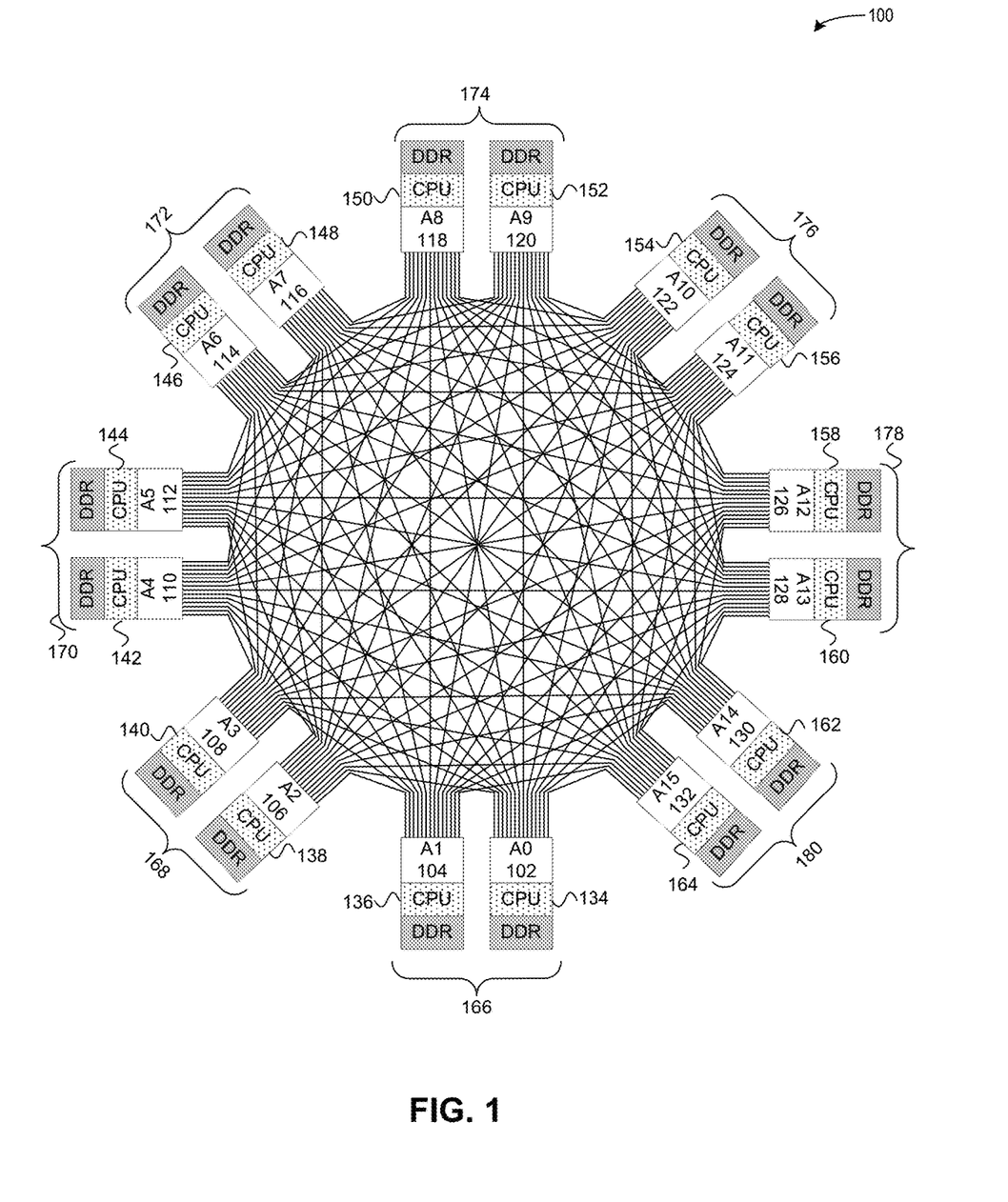
FIG. 1 illustrates an exemplary system architecture for a coherent non-uniform memory access (NUMA) system, according to one embodiment.

FIG. 1 illustrates an exemplary system architecture for a coherent NUMA system, according to one embodiment. In the example shown in FIG. 1, system 100 represents a coherent NUMA system which can provide hardware-managed cache coherency for memory devices attached to one or more processors.

System 100 can include a plurality of nodes 166-180 with each node including a processor group. A processor group can include two or more processors, with each processor housed in a CPU socket, e.g., CPU 134 and CPU 136 can represent one processor group. System 100 can include node controllers A0 102-A15 132 and each CPU socket can be coupled to a respective node controller. For simplicity, only one CPU socket is shown to be coupled to each node controller. In general system 100 can be configured to use at least two CPU sockets per node controller. Two node controllers coupled to a group of processors, e.g., A0 102 and A1 104 coupled to CPU 136 and CPU 134, respectively, can represent a base node 166 which can correspond to a basic building block of system 100. System 100 can include base node 166 and additional seven nodes 168-180 to provide an ability to scale from four processors per node to 32 processors for eight nodes.

Each processor can be coupled to a corresponding node controller via Ultra Path Interconnect (UPI) links to send cache coherent data traffic to other nodes in the fabric. Furthermore, each processor can be coupled to a plurality of memory devices using Double Data Rate (DDR) Dual In-line Memory Module (DIMM) slots. Since system 100 includes processor-attached memory devices, an increase in the number of memory devices may also increase the number of processors, thereby resulting in additional costs for system 100.

Each node controller in base node 166 and seven additional nodes 168-180 can include an Application Specific Integrated Circuit (ASIC). The ASIC embedded in each node controller can maintain hardware cache-coherency among memory devices coupled to the processors by tracking cache state and ownership information across all the processors in the cache-coherent fabric based on for example a directory cache built within the ASIC.

By using hardware-managed cache coherency, system 100 may not require software modifications. Furthermore, since the transfer of ownership can be accomplished quickly by hardware, system 100 can provide improved performance when applications share large amounts of fine-grained data.

However, due to disadvantages associated with hardware-managed cache-coherency, system 100 may perform suboptimally. Specifically, the hardware-managed cache-coherency often tracks the state and ownership information across all remote data, i.e., memory data associated with a memory that is attached to the local processor group but held by a remote processor, even when the data is written infrequently or written once during the execution of the application. This tracking process can consume memory bandwidth and add latency to remote memory access. Furthermore, when a component in a hardware-managed cache-coherency system fails, the operation of other working components or resources in the system can be disrupted, thereby impacting the hardware-managed cache-coherency. Memory attached to a defective processor would need to be transferred through a working CPU socket including a functional processor as there is no other access path, which can result in reduced system resilience against failures.

Software-managed cache-coherency may overcome some of the aforementioned problems associated with hardware-managed cache coherency. Specifically, system 100 implementing software-managed cache-coherency can result in less memory bandwidth consumption and reduce added latency to remote memory access. Furthermore, when applications share large granular blocks of data or modify data infrequently with few semaphore locking sequences, software-managed cache-coherency can perform with improved efficiency when compared with hardware-managed cache-coherency. In other words, when the number of coherency items processed is fewer, the overall cost of system 100 implementing software-managed cache-coherency can be less than that of hardware-managed cache-coherency. However, software-managed cache-coherency might reduce the performance of system 100 when a large number of coherency protocol events with semaphore locking or other sequences occur. In addition, implementing software-managed cache-coherency can require complex application programming.

Embodiments described in the present disclosure provide a hybrid cache-coherent NUMA system that can effectively incorporate the benefits of hardware-managed cache coherency and software-managed cache coherency, and can facilitate independent scaling of cache-coherent memory and processors.

Figure 2:
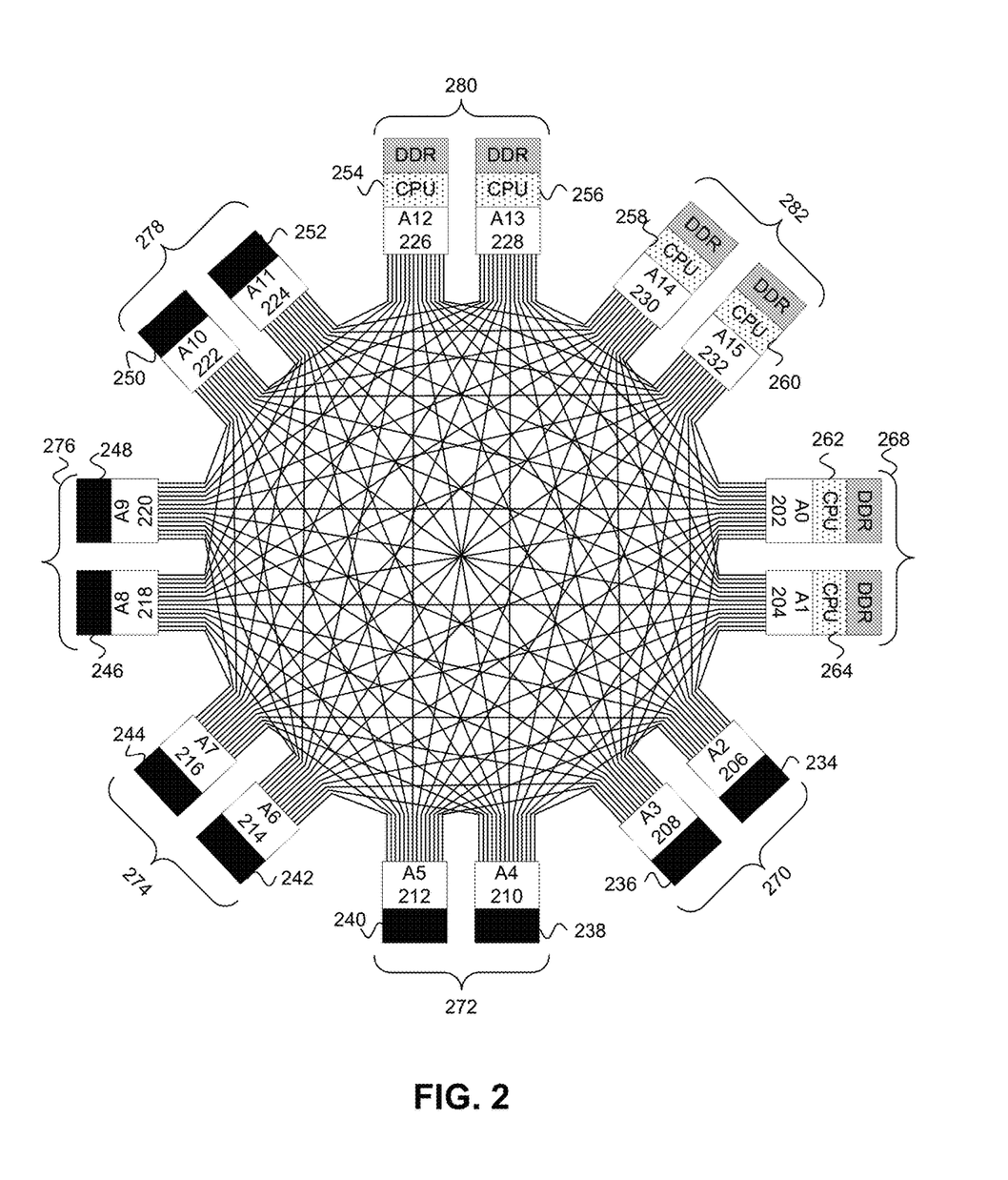
FIG. 2 illustrates an exemplary system architecture for a hybrid cache-coherent NUMA system, according to one embodiment.

FIG. 2 illustrates an exemplary system architecture for a hybrid cache-coherent NUMA system, according to one embodiment. In the example shown in FIG. 2, system 200 can include a plurality of nodes 268-282 that can be grouped into a first subset of nodes including processor-attached memory, i.e. nodes 280, 282, and 268, and a second subset of nodes including non-processor attached memory, i.e., nodes 270-278. The first subset of nodes can include a plurality of node controllers, i.e., {A0 202, A1 204, A12 226, A13 228, A14 230, and A15 232}, coupled to processors CPU 262, CPU 264, CPU 254, CPU 256, CPU 258, and CPU 260, respectively. Each processor is housed in a respective CPU socket that provides interfaces for coupling to a respective node controller.

Each processor can be coupled to an ASIC included in a corresponding node controller via UPI links to send cache coherent data traffic to processors in other nodes in the cache coherent fabric and each processor can be coupled to DDR DIMM slots. Each node controller can include an interface to connect with other node controllers in the cache-coherent fabric, to allow a node controller in one node in the cache coherent fabric to have access to memory in another node. Additionally, each node controller can provide an interface including a plurality of ports for connecting to a local memory fabric, e.g., a Gen-Z memory fabric based on the Gen-Z specification by the Gen-Z consortium, using a Gen-Z interface or a remote memory fabric using a Remote Direct Memory Access (RDMA) over an Ethernet interface.

In system 200, the second subset of nodes can include node controllers A2 206-A11 224, with each node controller interfaced to a respective group of memory devices, e.g., memory 234-memory 252, based on a Gen-Z interface, an InfiniBand® interface, or an Ethernet interface. Since the second subset of nodes do not include processors, system 200 can allow memory devices to be added independent of the number of processors in the first subset of nodes.

For example, the node controllers in the second subset of nodes may provide an interface with Gen-Z ports for connecting to a Gen-Z memory fabric, thereby allowing the Gen-Z memory fabric to scale independently of the number of processors in the first subset of nodes. In other words, the Gen-Z memory fabric or any other memory attached to these node controllers can be independent of microprocessors running the operating system for system 200. Therefore, system 200 can provide flexibility to independently scale non-processor attached memory devices.

Furthermore, the ASICs associated with the node controllers in the first and second subset of nodes can be configured to facilitate and maintain hardware-managed cache coherency among memory devices attached to the processors, and can further be configured to support software-managed cache coherency among memory devices, e.g., Gen-Z memory fabric, attached to the node controllers.

Specifically, system 200 can provide hardware-managed cache coherency for processor-attached memory and software-managed cache coherency for non-processor-attached memory. Such a hybrid system can improve performance efficiency by optimizing separation between hardware-managed and software-managed coherency. A system architecture of each node in the first subset of nodes and the second subset of nodes in system 200 is described below in relation to FIGS. 3A and 3B, respectively.

Figure 3A:
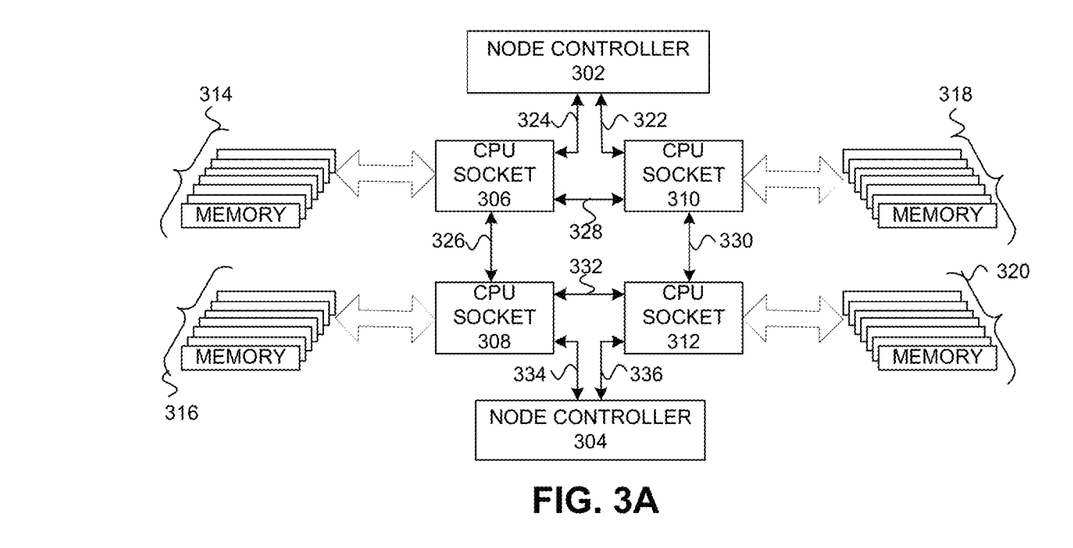
FIG. 3A illustrates an exemplary node architecture including processor-attached memory, according to one embodiment.

FIG. 3A illustrates an exemplary node architecture including processor-attached memory, according to one embodiment. The node architecture can represent a node in a hybrid cache-coherent NUMA system shown in FIG. 2, e.g., node 280, which can include processor-attached memory. The node architecture can include two node controllers 302 and 304 with each node controller including an ASIC. Furthermore, each node controller ASIC can provide ports to interface with node controllers within the same node and to facilitate connections with node controllers in other nodes in the hybrid cache-coherent NUMA system, thereby providing capability to scale the number of processors from four to at least twelve processors.

In addition, each node controller ASIC can provide two UPI links to interface with two processors to send cache-coherent data traffic to other nodes in the hybrid coherent NUMA system. Specifically, node controller 302 can interface with processors in respective CPU sockets 306 and 310 via UPI links 322 and 324, respectively. Node controller 304 can interface directly with processors in CPU sockets 308 and 312 via UPI links 334 and 336, respectively. The processors in respective CPU sockets 306-312 can be coupled in a ring-like topology via UPI links 326-332 forming a group of processors. Each processor can include one or more processor cores. Furthermore, a processor in each CPU socket can be coupled to a respective DDR DIMMs 314-320. At least one processor can support persistent memory in addition to the DDR DIMMs. In one embodiment, at least one node controller in the node architecture can be coupled to a remote memory bank, e.g., Gen-Z memory fabric using RDMA technology.

Figure 3B:
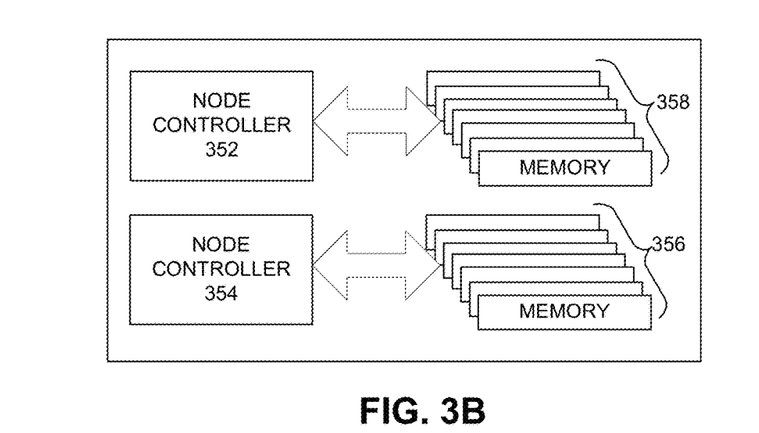
FIG. 3B illustrates an exemplary node architecture including non-processor-attached memory, according to one embodiment.

FIG. 3B illustrates an exemplary node architecture including non-processor attached memory, according to one embodiment. The node architecture can represent any one of nodes 270-278 in the hybrid coherent NUMA system shown in FIG. 2. The node architecture can include two node controllers 352 and 354 that can interface with memory banks 356 and 358, respectively. Memory banks 356 and 358 can be Gen-Z memory, or any other type of memory bank. For example, the interfaces provided by node controllers 352 and 354 can be based on one or more of: Gen-Z interface, an InfiniBand® interface, and an Ethernet interface. The operation of the node architectures shown in FIGS. 3A and 3B is described below in relation to FIG. 4.

Figure 3C:
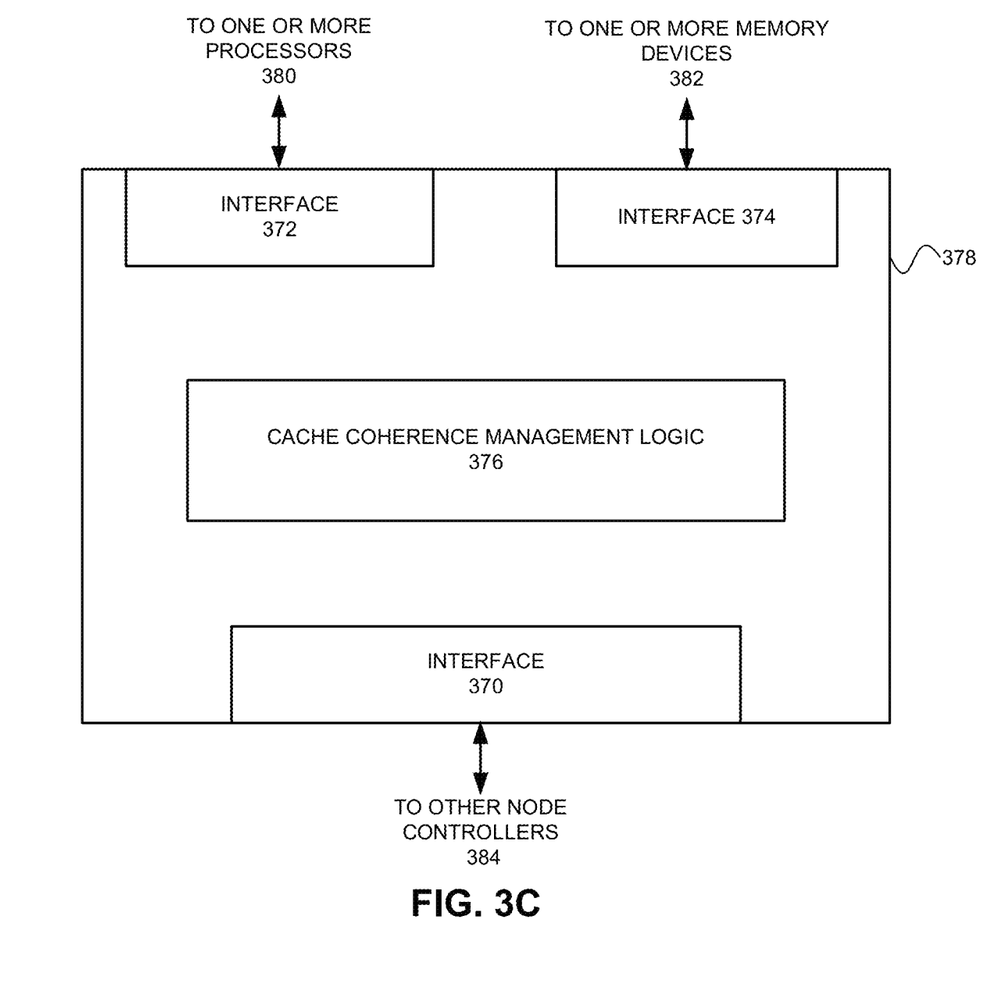
FIG. 3C illustrates an exemplary block diagram of a node controller, according to one embodiment.

FIG. 3C illustrates an exemplary block diagram of a node controller, according to one embodiment. Node controller 378 can include a number of interfaces that can facilitate communication between a number of components within the hybrid cache-coherent NUMA system. Specifically, node controller 378 can include an interface 372 that can provide UPI links to interface with one or more processors 380 and to access a plurality of memory devices attached to the processors. Node controller 378 can include an interface 374 to facilitate communication with a plurality of memory devices 382. Interface 374 can be a Gen-Z interface, a Peripheral Component Interconnect express (PCIe) interface, an InfiniBand® interface, a DDR interface, an Ethernet interface, etc.

Node controller 378 can include interface 370 that can provide NUMA links to facilitate communication with other node controllers 384 in the hybrid cache-coherent NUMA system. Node controller 378 can further include a cache coherence management logic 376 that can operate two different hardware modules, one for managing hardware cache coherency of processor-attached memory and the other for facilitating software cache coherency of non-processor attached memory.

Specifically, cache coherence management logic 376 can implement a hardware cache-coherence protocol, e.g., a directory-based cache-coherence protocol. The hardware cache-coherence protocol can include a set of procedures or rules (which can be implemented as state machines or a microcontroller) that dictate how node controller 378 is to interact with an associated processor or memory depending upon the current coherence status for a particular memory block specified in a memory access request. Hardware cache coherence protocol may also dictate how to track the ownership of a cache line.

Furthermore, cache coherence management logic 376 can be configured to facilitate software-managed cache coherency when managing memory included in software coherent space. A software coherence protocol can perform the software-managed cache coherency for non-processor attached memory. In one embodiment, an operating system or applications running on one or more of the processors in the hybrid cache-coherent NUMA system can implement a software module to activate the software coherence protocol when managing coherence of non-processor attached memory or the software module can be a standalone component.

Figure 4:
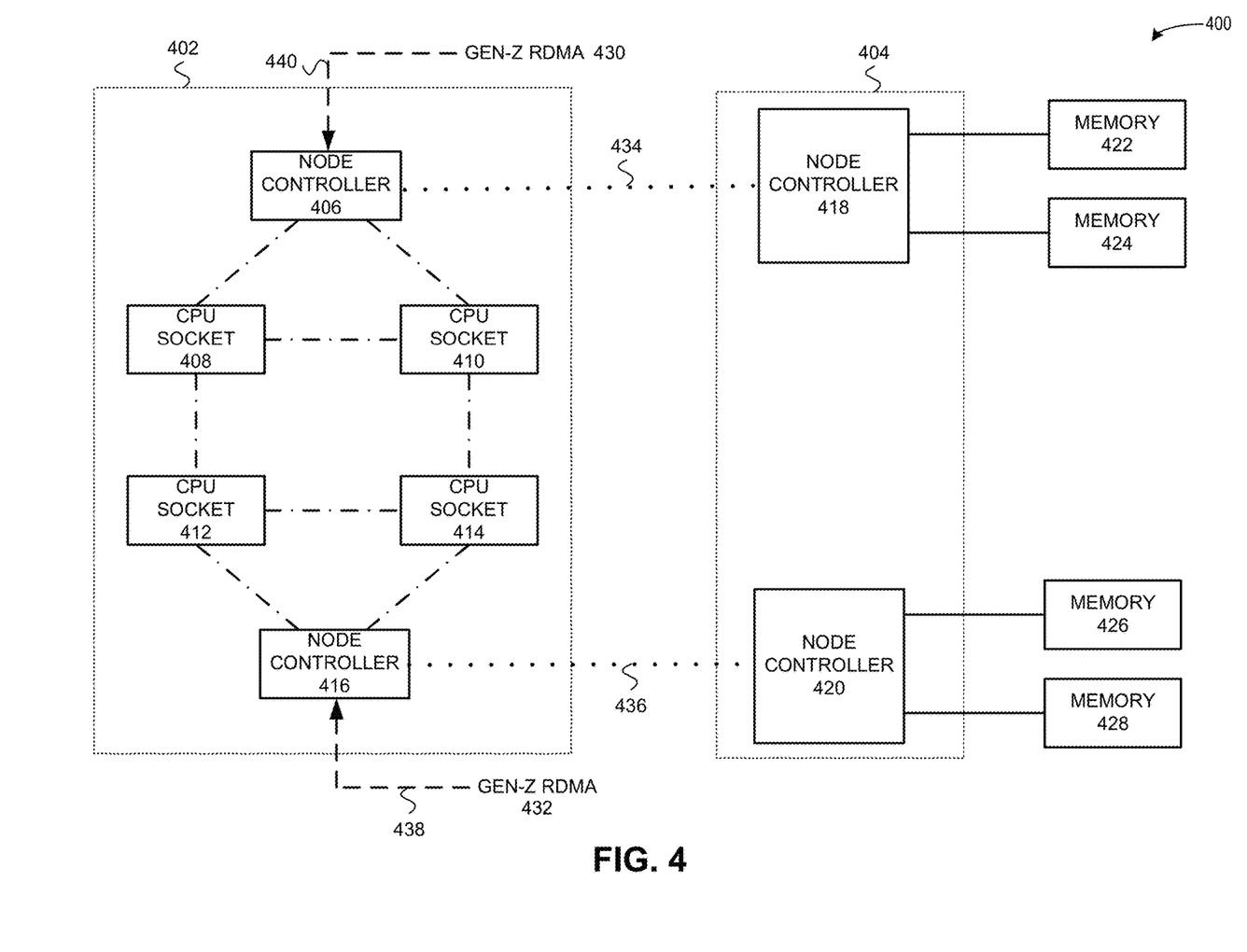
FIG. 4 illustrates an exemplary block diagram of a hybrid system supporting both hardware-managed and software-managed cache coherency, according to one embodiment.

FIG. 4 illustrates an exemplary block diagram of a hybrid system supporting both hardware-managed and software-managed cache coherency, according to one embodiment. In the example shown in FIG. 4, node 402 can represent one of the nodes in the hybrid coherent NUMA system including CPU sockets, i.e., the node includes processors attached to node controllers. Node 404 can represent one of the nodes in the hybrid coherent NUMA system that does not include CPU sockets, i.e., the node does not include processors attached to node controllers, and includes non-processor attached memory. Node 402 can include four CPU sockets 408-414 with each CPU socket including a processor, and the processors can be coupled to each other via UPI links (shown in dash-dotted lines). Processors in respective CPU sockets 408 and 410 can be coupled to node controller 406, and processors in respective CPU sockets 412 and 414 can be coupled to node controller 416.

In one embodiment, node controllers 406 and 416 can further allow connections to external memory banks 432 and 430 via links 438 and 440 (shown in dashed lines), respectively. Memory banks 430 and 432 can correspond to a Gen-Z RDMA memory fabric which can be hosted using Gen-Z ports of respective node controllers 406 and 416.

Node controllers 406 and 416 can each include an ASIC with a cache coherence management logic that can operate a first circuitry and/or a second circuitry based on whether the node includes processor-attached memory or non-processor attached memory. The cache coherence management logic can facilitate and maintain hardware-managed cache-coherency for memory devices attached to processors in respective CPU sockets 408 and 410. In addition, node controllers 406 and 416 may operate a second circuitry to facilitate a software coherence protocol to manage the coherence of memory devices associated with memory banks 430 and 432. The software coherence protocol can be implemented by a software module hosted by an operating system or applications running on one or more of the processors in respective CPU sockets 408-414 or the software module can be a standalone component.

At node 404, node controllers 418 and 420 can be coupled to non-processor attached memory devices 422-424 and 426-428, respectively. Links 434 and 436 (shown in dotted lines) can represent NUMA links, which can connect node 402 with node 404 in the cache coherent NUMA system. Since node controllers 418 and 420 are coupled to memory devices 422-424 and 426-428 respectively, they can be configured to use a first circuitry in the cache coherence management logic to facilitate and maintain hardware-managed cache coherency for memory device 422-428.

Therefore, node controllers in hybrid cache coherent NUMA system can be flexibly configured to facilitate software-managed cache coherency and/or hardware-managed cache coherency based on the type of memory attached directly to the node controllers and based on whether the node controllers are attached to a memory group via the processors. In other words, node controllers in the hybrid cache coherent NUMA system can be re-purposed based on their connections with respect to memory devices in the hybrid cache coherent NUMA system.

In one embodiment, applications hosted by the operating system and running on one or more of the processors can be aware of the partitioning of memory space into hardware-managed and software-managed memory space. Based on the knowledge of the partitioning of the memory space, the applications can issue memory requests and use the memory space accordingly, and the operating system can include a management capability to manage the applications based on the hybrid memory space.

Figure 5:
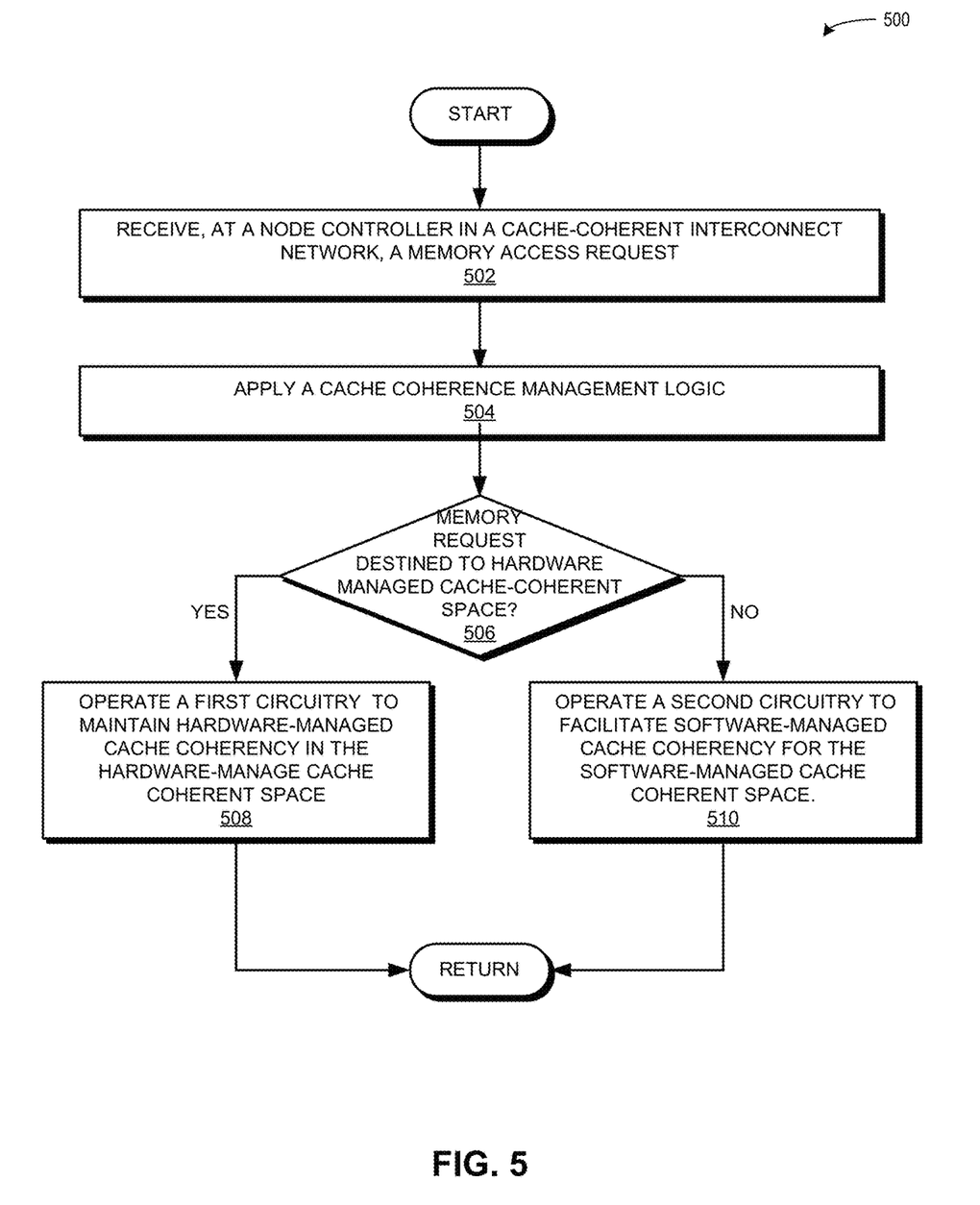
FIG. 5 presents a flowchart illustrating a process for managing a hybrid cache-coherent NUMA system, according to one embodiment.

FIG. 5 presents a flowchart illustrating a process for managing a hybrid cache-coherent NUMA system, according to one embodiment. Referring to flowchart 500 in FIG. 5, during operation, a node controller in a hybrid cache-coherent interconnect network, can receive a memory access request (operation 502). In response to receiving the memory access request, the node controller may apply a cache coherence management logic (operation 504) to determine a type of cache-coherent memory space the memory access request is destined. Specifically, the cache coherence management logic can determine if the memory access request is destined to a hardware-managed cache coherent space (operation 506). When the memory access request is destined to hardware managed cache-coherent space, the cache coherence management logic can operate a first circuitry to maintain the hardware-managed cache-coherent space (operation 508).

In response to determining that the memory access request is destined to a software managed cache-coherent space, the cache coherence management logic can operate a second circuitry to facilitate the software-managed cache-coherent space (operation 510) and the operation returns. In one embodiment, an operating system or applications running on one or more processors in the hybrid cache-coherent interconnect network may maintain the software coherency in the software managed cache-coherent space by implementing a software coherence protocol.

Exemplary Computer System and Apparatus

Figure 6:
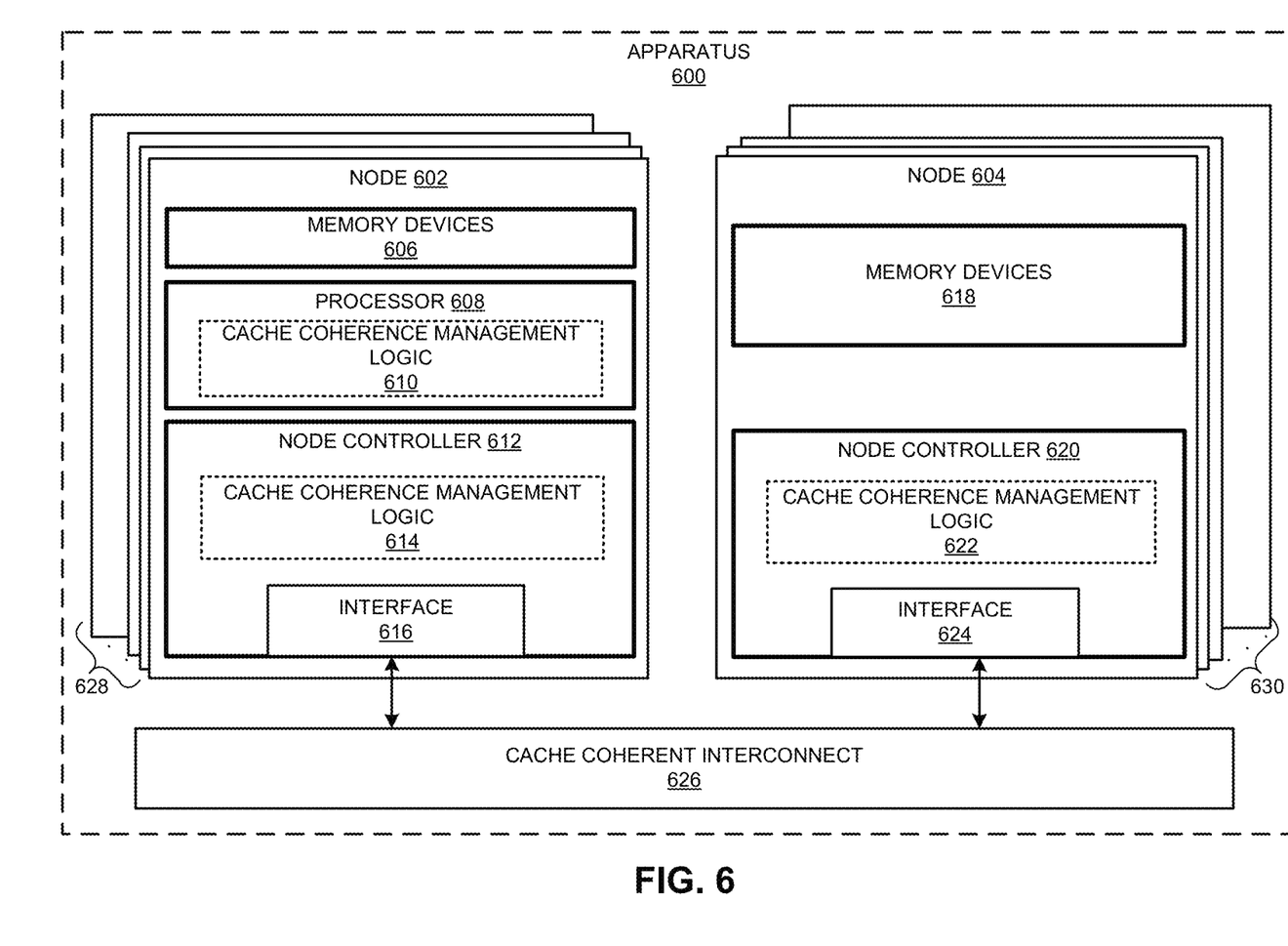
FIG. 6 illustrates an exemplary computer system that facilitates a hybrid cache-coherent NUMA system, according to one embodiment.

FIG. 6 illustrates an exemplary computer system that facilitates a hybrid cache-coherent NUMA system, according to one embodiment. Apparatus 600 can include a cache-coherent interconnect network including a plurality of nodes, i.e., nodes 628 and 630, coupled to each other via a plurality of NUMA links represented by a cache coherent interconnect 626. The plurality of nodes can include a first subset of nodes 628 and a second subset of nodes 630.

Each node 602 in first subset of nodes 602 nodes can include a number of processors, e.g., four processors, coupled to each other via UPI links in a ring-like topology. For simplicity only one processor 608 is shown in FIG. 6. Node 602 can include a plurality of node controllers, e.g., two node controllers, with each node controller 612 coupled to two processors out of four processors via UPI links. In one embodiment, one or more of the processors may include a cache coherence management logic 610 for managing software cache coherency of memory devices in a software coherent space. The memory devices in the software coherent space can be attached to at least one of the node controllers using for example one of a Gen-Z interface, an InfiniBand® interface, and an Ethernet interface.

Each node controller 612 can include an interface 616 that can provide a plurality of ports for connecting to other node controllers in first subset of nodes 628 and second subset of nodes 630 via cache coherent interconnect 626 including a plurality of NUMA links. Furthermore, each node controller 612 can include a cache coherence management logic 614 that can manage hardware cache-coherency and/or for facilitating software cache-coherency. In one embodiment, cache coherence management logic 610 associated with processor 608 can maintain software cache-coherency while cache coherence management logic 614 may facilitate the software cache-coherency.

Each node 604 in second subset of nodes 630 can include a slightly different architecture compared to first subset of nodes 628. Specifically, node 602 may not include CPU sockets (meaning there is no processor attached to node controller 620), instead node controller 620 can be coupled to memory devices 618, thereby allowing scaling of memory independent of the processors in first subset of nodes 628. Similar to node 602, node 604 can include two node controllers 620, with each node controller including a cache coherence management logic 622 for maintaining hardware cache-coherency and/or facilitating software-managed cache coherency among memory devices 618 coupled to node controller 620. Node controller 620 can include an interface 624 that can provide a plurality of ports for connecting with other nodes in second subset of nodes 630 and first subset of nodes 628 via cache coherent interconnect 626 including a plurality of NUMA links.

One embodiment described in the present disclosure can provide a node controller. The node controller can include a first interface to interface with one or more processors, a second interface to interface with other node controllers in the cache-coherent interconnect network. The node controller can further include a third interface to interface with a first plurality of memory devices. The node controller can include a cache coherence management logic that can maintain, based on a first circuitry, hardware-managed cache coherency in the cache-coherent interconnect network. The cache coherence management logic can further facilitate, based on a second circuitry, software-managed cache coherency in the cache-coherent interconnect network.

In a variation on this embodiment, the cache coherence management logic can operate the first circuitry, in response to determining that a memory access request is destined to a hardware-managed cache coherent space in the cache-coherent interconnect network. The cache coherence management logic can operate the second circuitry, in response to determining that the memory access request is destined to a software-managed cache coherent space in the cache-coherent interconnect network.

In a variation on this embodiment, the cache coherence management logic can operate the first circuitry, in response to determining that the memory access request is destined to a second plurality of memory devices coupled to the one or more processors to which the node controller is coupled. The second plurality of memory devices can correspond to a hardware-managed cache-coherent space. Furthermore, cache coherence management logic can operate the second circuitry, in response to determining that the memory access request is destined to the first plurality of memory devices coupled to the node controller, wherein the node controller is coupled to the one or more processors that are coupled to the second plurality of memory devices. The first plurality of memory devices can correspond to a software-managed cache-coherent space.

In a variation on this embodiment, the cache coherence management logic can operate the first circuitry, in response to determining that a memory access request is destined to the first plurality of memory devices coupled to the node controller. The node controller is not coupled to the one or more processors and the first plurality of memory devices can correspond to a hardware-managed cache-coherent space.

In a variation on this embodiment, the first interface can facilitate Ultra Path Interconnect (UPI) links for coupling with the one or more processors. The second interface can facilitate a plurality of Non-uniform Memory Access (NUMA) links for coupling with other node controllers in the cache-coherent interconnect network.

In a further variation, the third interface comprises one or more of: a Gen-Z interface; an InfiniBand interface; and an Ethernet interface.

In a further variation, the first circuitry can implement a directory-based hardware-managed cache coherence protocol.

In a further variation, the second circuitry can facilitate a software-managed cache coherence protocol. The one or more processors can implement the software-managed cache coherence protocol.

One embodiment can provide a system, the system can include a plurality of nodes in a cache-coherent interconnect network. A respective node in a first subset of the nodes can include: a group of processors; a first plurality of memory groups with each memory group coupled to a processor; a first plurality of node controller with each node controller coupled to one or more processors. A respective node in a second subset of nodes can include: a second plurality of memory groups; and a second plurality of node controllers with each node controller coupled to respective second plurality of memory groups. A respective node controller can include a cache coherence management logic which includes: a first circuitry that is configured to maintain hardware-managed cache coherency in the cache-coherent interconnect network; and a second circuitry that is configured to facilitate software-managed cache coherency in the cache-coherent interconnect network.

One embodiment can provide a system and method for providing hybrid hardware-managed and software-managed cache coherency in a distributed computing system. During operation, a node controller in a cache-coherent interconnect network can receive a memory access request. The node controller can apply a cache coherence management logic based on the memory access request to operate the first circuitry, in response to determining that the memory access request is destined to a hardware-managed cache coherent space in the cache-coherent interconnect network. The node controller can apply a cache coherence management logic based on the memory access request to operate the second circuitry, in response to determining that the memory access request is destined to a software-managed cache coherent space in the cache-coherent interconnect network.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown, but is to be accorded the widest scope consistent with the principles and features disclosed herein.

What is claimed is:

1. A node controller, comprising:
   a first interface to interface with one or more processors;
   a second interface to interface with other node controllers in a cache-coherent interconnect network;
   a third interface to interface with a first plurality of memory devices;
   a cache coherence management logic to:
     maintain, based on a first circuitry, hardware-managed cache coherency in the cache-coherent interconnect network; and
     facilitate, based on a second circuitry, software-managed cache coherency in the cache-coherent interconnect network;
   wherein the cache coherence management logic is further to:
     operate the first circuitry, in response to determining that a memory access request is destined to a second plurality of memory devices coupled to the one or more processors to which the node controller is coupled, wherein the second plurality of memory devices correspond to a hardware-managed cache-coherent space; and
operate the second circuitry, in response to determining that a memory access request is destined to the first plurality of memory devices coupled to the node controller, wherein the node controller is coupled to the one or more processors that are coupled to the second plurality of memory devices, and wherein the first plurality of memory devices correspond to a software-managed cache-coherent space.

2. The node controller of claim 1, wherein the cache coherence management logic is further to:
operate the first circuitry, in response to determining that a memory access request is destined to a hardware-managed cache coherent space in the cache-coherent interconnect network; and
operate the second circuitry, in response to determining that a memory access request is destined to a software-managed cache coherent space in the cache-coherent interconnect network.

3. The node controller of claim 1, wherein the first interface facilitates Ultra Path Interconnect (UPI) links for coupling with the one or more processors; and
wherein the second interface facilitates a plurality of Non-uniform Memory Access (NUMA) links for coupling with other node controllers in the cache-coherent interconnect network.

4. The node controller of claim 1, wherein the third interface comprises one or more of:
a Gen-Z interface;
an InfiniBand interface; and
an Ethernet interface.

5. The node controller of claim 1, wherein the first circuitry implements a directory-based hardware-managed cache coherence protocol.

6. The node controller of claim 1, wherein the second circuitry facilitates a software-managed cache coherence protocol, and wherein the one or more processors implement the software-managed cache coherence protocol.

7. A system comprising:
a plurality of nodes in a cache-coherent interconnect network, wherein a respective node in a first subset of the nodes includes:
a group of processors;
a first plurality of memory groups with each memory group coupled to a processor; and
a first plurality of node controllers with each node controller coupled to one or more processors;
wherein a respective node in a second subset of the nodes includes:
a second plurality of memory groups; and
a second plurality of node controllers with each node controller coupled to a respective memory group in the second plurality of memory groups; and
wherein each node controller of the first plurality of node controllers and the second plurality of node controllers comprises a cache coherence management logic, which includes:
a first circuitry to maintain hardware-managed cache coherency in the cache-coherent interconnect network; and
a second circuitry to facilitate software-managed cache coherency in the cache-coherent interconnect network;

wherein the cache coherence management logic is further to:
operate the first circuitry, in response to determining that a memory access request is destined to the first plurality of memory groups, wherein first plurality of memory groups corresponds to a hardware-managed cache-coherent space; and
operate the second circuitry, in response to determining that a memory access request is destined to a third plurality of memory devices coupled to the node controller, wherein the node controller is coupled to the group of processors that are coupled to the first plurality of memory groups, and wherein the third plurality of memory devices corresponds to a software-managed cache-coherent space.

8. The system of claim 7, wherein the cache coherence management logic is further to:
operate the first circuitry, in response to determining that a memory access request is destined to a hardware-managed cache coherent space in the cache-coherent interconnect network; and
operate the second circuitry, in response to determining that a memory access request is destined to a software-managed cache coherent space in the cache-coherent interconnect network.

9. The system of claim 7, wherein the cache coherence management logic is further to:
operate the first circuitry, in response to determining that a memory access request is destined to the second plurality memory groups, wherein the second plurality memory groups corresponds to a hardware-managed cache-coherent space.

10. The system of claim 7, wherein the respective node controller further includes:
a first interface to interface with the group of processors;
a second interface to interface with other node controllers in the cache-coherent interconnect network; and
a third interface to interface with the second plurality of memory groups.

11. The system of claim 10, wherein the first interface facilitates Ultra Path Interconnect (UPI) links for coupling with the group of processors; and
wherein the second interface facilitates a plurality of Non-uniform Memory Access (NUMA) links for coupling with other node controllers in the cache-coherent interconnect network.

12. The system of claim 10, wherein the third interface comprises one or more of:
a Gen-Z interface;
an InfiniBand interface; and
a Ethernet interface.

13. The system of claim 7, wherein each memory group in the first plurality of memory groups corresponds to a group of Double Data Rate (DDR) Dual In-Line Memory Modules (DIMMs).

14. The system of claim 7, wherein the first circuitry implements a directory-based hardware-managed cache coherence protocol;
wherein the second circuitry supports a software-managed cache coherence protocol; and
wherein the one or more processors implement the software-managed cache coherence protocol.

* * * * *